(12) United States Patent
Master et al.

(10) Patent No.: US 8,452,586 B2
(45) Date of Patent: May 28, 2013

(54) IDENTIFYING MUSIC FROM PEAKS OF A REFERENCE SOUND FINGERPRINT

(75) Inventors: Aaron Master, Mountain View, CA (US); Timothy P. Stonehocker, Sunnyvale, CA (US)

(73) Assignee: Soundhound, Inc., Santa Clara, CA (US)

( * ) Notice: Subject to any disclaimer, the term of this patent is extended or adjusted under 35 U.S.C. 154(b) by 570 days.

(21) Appl. No.: 12/629,821

(22) Filed: Dec. 2, 2009

(65) Prior Publication Data
US 2010/0145708 A1 Jun. 10, 2010

Related U.S. Application Data

(60) Provisional application No. 61/119,156, filed on Dec. 2, 2008.

(51) Int. Cl.
*G10L 19/02* (2006.01)
*G10L 21/00* (2006.01)

(52) U.S. Cl.
USPC .......... 704/200.1; 704/206; 704/270

(58) Field of Classification Search
USPC .......... 704/200.1, 205, 206, 231, 236, 270, 704/500, 501; 84/615, 616
See application file for complete search history.

(56) References Cited

U.S. PATENT DOCUMENTS

| | | | |
|---|---|---|---|
| 6,542,869 B1 * | 4/2003 | Foote | 704/500 |
| 6,633,845 B1 | 10/2003 | Logan et al. | |
| 6,995,309 B2 * | 2/2006 | Samadani et al. | 84/603 |
| 7,323,629 B2 * | 1/2008 | Somani et al. | 84/470 R |
| 7,328,153 B2 | 2/2008 | Wells et al. | |
| 7,373,209 B2 * | 5/2008 | Tagawa et al. | 700/94 |
| 7,379,875 B2 * | 5/2008 | Burges et al. | 704/273 |
| 7,580,832 B2 * | 8/2009 | Allamanche et al. | 704/205 |
| 7,672,916 B2 * | 3/2010 | Poliner et al. | 706/20 |
| 7,756,874 B2 * | 7/2010 | Hoekman et al. | 707/737 |
| 7,858,868 B2 * | 12/2010 | Kemp et al. | 84/615 |
| 7,899,818 B2 * | 3/2011 | Stonehocker et al. | 707/731 |
| 7,908,135 B2 * | 3/2011 | Shishido | 704/205 |
| 8,013,230 B2 * | 9/2011 | Eggink | 84/609 |
| 8,073,684 B2 * | 12/2011 | Sundareson | 704/200.1 |
| 2001/0005823 A1 * | 6/2001 | Fischer et al. | 704/205 |
| 2003/0106413 A1 * | 6/2003 | Samadani et al. | 84/603 |
| 2004/0231498 A1 * | 11/2004 | Li et al. | 84/634 |
| 2006/0059225 A1 * | 3/2006 | Stonehocker et al. | 709/202 |
| 2006/0122839 A1 * | 6/2006 | Li-Chun Wang et al. | 704/273 |

(Continued)

FOREIGN PATENT DOCUMENTS
EP 1367590 A2 12/2003

OTHER PUBLICATIONS

International Search Report, appl. No. PCT/2009.066458, mailed Jun. 23, 2010.

*Primary Examiner* — Martin Lerner
(74) *Attorney, Agent, or Firm* — Haynes Beffel & Wolfeld LLP; Ernest J. Beffel, Jr.

(57) ABSTRACT

Components of a method and system that allow identification of music from the song or sound using only the sound of the audio being played. A system built using the method and device components disclosed processes inputs sent from a mobile phone over a telephone or data connection, though inputs might be sent through any variety of computers, communications equipment, or consumer audio devices over any of their associated audio or data networks.

39 Claims, 4 Drawing Sheets

U.S. PATENT DOCUMENTS

| | | | |
|---|---|---|---|
| 2006/0169126 A1* | 8/2006 | Ishiwata et al. | 84/615 |
| 2007/0016404 A1* | 1/2007 | Kim et al. | 704/200.1 |
| 2007/0055500 A1 | 3/2007 | Bilobrov | |
| 2007/0239676 A1* | 10/2007 | Stonehocker et al. | 707/3 |
| 2008/0022844 A1* | 1/2008 | Poliner et al. | 84/609 |
| 2009/0031882 A1* | 2/2009 | Kemp et al. | 84/609 |
| 2009/0119097 A1* | 5/2009 | Master et al. | 704/207 |
| 2009/0125298 A1* | 5/2009 | Master et al. | 704/200.1 |
| 2009/0125301 A1* | 5/2009 | Master et al. | 704/208 |
| 2010/0211693 A1* | 8/2010 | Master et al. | 709/238 |
| 2011/0132173 A1* | 6/2011 | Shishido | 84/602 |
| 2011/0132174 A1* | 6/2011 | Shishido | 84/602 |
| 2011/0213475 A1* | 9/2011 | Herberger et al. | 700/94 |
| 2012/0029670 A1* | 2/2012 | Mont-Reynaud et al. | 700/94 |
| 2012/0232683 A1* | 9/2012 | Master et al. | 700/94 |

* cited by examiner

Alignment score
705

Different framing scores
715

Return score
725

Figure 7

IDENTIFYING MUSIC FROM PEAKS OF A REFERENCE SOUND FINGERPRINT

RELATED APPLICATION

This application claims the benefit of U.S. Patent Provisional Application No. 61/119,156 filed on Dec. 2, 2008. The provisional application is incorporated by reference.

BACKGROUND OF THE INVENTION

Music and other recorded sound often plays in public and private spaces where there is little or no identifying information about that music. For example, a song could be playing in a bar or restaurant, on a car radio or at a gathering, where there is often no easy way to determine the artist and/or title information about the song to facilitate finding it again. In such situations, it is desirable to have a way to identify the song or sound using only the sound of the audio being played.

SUMMARY OF THE INVENTION

We disclose useful components of a method and system that allow identification of music from the song or sound using only the sound of the audio being played. A system built using the method and device components disclosed processes inputs sent from a mobile phone over a telephone or data connection, though inputs might be sent through any variety of computers, communications equipment, or consumer audio devices over any of their associated audio or data networks.

BRIEF DESCRIPTION OF THE DRAWINGS

FIG. 7 depicts the method for computing a score.

DETAILED DESCRIPTION

The assignee of this application builds and distributes the popular Midomi app and software. Users of Midomi can hold their cell phone up to a car speaker, for instance, capture a brief sample of the play back, and have the song that they are listening to identified with useful links for previewing or buying the artist's music. Doing this presents a wide variety of technical challenges. This disclosure describes several of the challenges and technology that is useful for building components of Midomi-like systems and other sound recognition applications.

The following detailed description is made with reference to the figures. Preferred embodiments are described to illustrate the present invention, not to limit its scope, which is defined by the claims. Those of ordinary skill in the art will recognize a variety of equivalent variations on the description that follows. We have used the term "characteristic matrix" in place of "fingerprint" to avoid confusion related to inconsistent use of the term fingerprint in the field of art. Fingerprint is used to refer to many things, but not to the sort of frame-by-frame, filter bank-by-filter bank characteristic matrix that we disclose.

Module to Obtain a Filterbank Representation

One component disclosed is useful to obtain a representation that allows reliable identification of matches between queries and references. By choosing the correct representation, we can ensure that the system will be robust to the types of additive noise and nonlinear distortions that affect the query audio data. We may consider the references to be fairly high quality audio, but the queries will be subject to at least five sources of distortion. Specifically, it is important to capture features that will survive such distortions as background noise, distortions due to the hardware of the collection device, distortions due to noise cancellation algorithms, distortions due to codecs and quantization and transmission errors.

Figure 1:
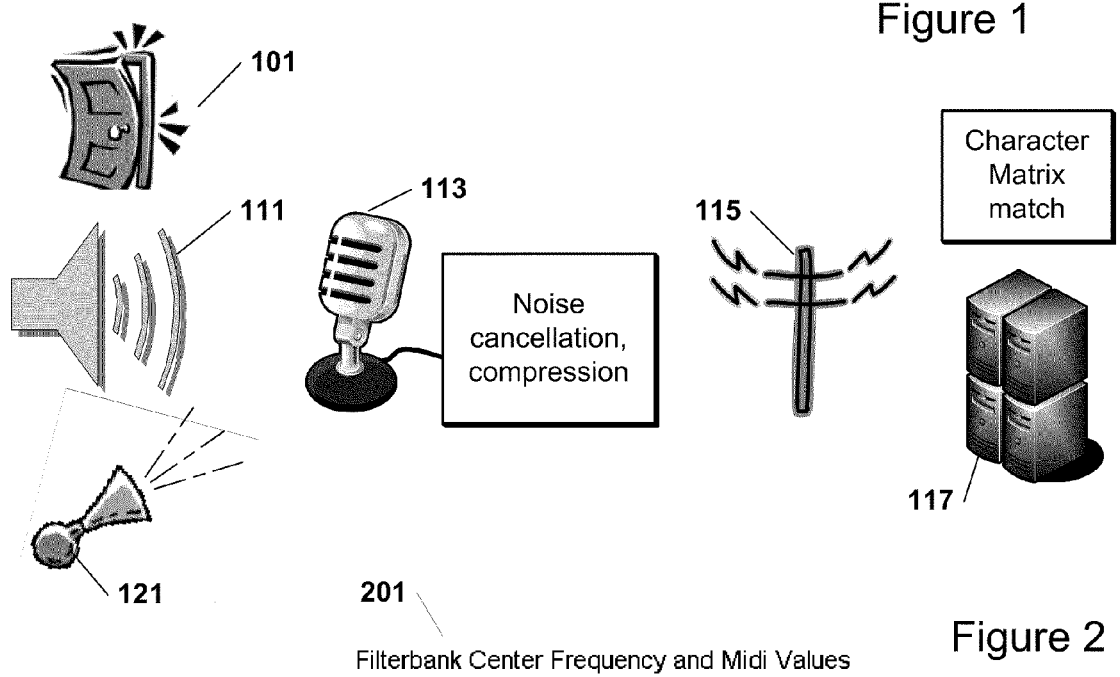
FIG. 1 depicts the various sources of noise.

It is preferred that these five types of distortion do not too strongly affect characteristic matrices of the query or references. If the characteristic matrices are distorted, it will be difficult to make meaningful comparisons between a query and a matching reference. The goal, then, is to build a characteristic matrix 117 based on information that is resilient to distortion, including some or all of these five types of distortion. FIG. 1 depicts the various sources of noise. The five types of distortion are identified and described below:

Background Noise

Background noise is noise that occurs in the same physical environment as the desired audio itself. This includes people talking 101, clinking glasses, transportation sounds like traffic, rumbling and honking 121, and sounds from nature such as those made by wind or animals. Generally, background noise is temporally limited and can be treated that way, when a system successfully separates background noise from the sound that is playing.

When there is background noise, the loudest parts of a signal, which preferably is the desired music, will still be passed. There is little that can be done if the background noise is drowning out the desired music signal at all times and frequencies, but it is desirable for a characteristic matrix to capture the desired music at times and frequencies that are less noisy. It is more desirable to process the signal at times and frequencies where it is present than to ignores larger time segments or frequency ranges.

Distortions Due to the Hardware of the Collection Device

The microphone 113 used on the phone or other device often has a bias in frequency, such as to accurately record only frequencies in which voice data tends to occur. The technology that we disclose accommodates such distortions.

Though the microphone may have a nonuniform frequency response, it can generally be counted on to pass information over the frequency range that encodes most speech sounds, specifically from about 100 Hz to about 4 kHz. Therefore, a characteristic matrix should rely primarily on frequency content inside this range. Also, the microphone may have a frequency response that reflects a bias towards lower or higher frequencies. Therefore, a characteristic matrix should not rely exclusively on the relative strengths of frequencies. A better solution is to determine which frequencies are loudest.

Distortions Due to Noise Cancellation Algorithms

Phones and other audio devices 111 often have noise cancellation algorithms 113 that seek to eliminate background sounds other than a particular desired input sound such as voice. These algorithms may seek to suppress or eliminate background music, which may be the very query audio our system wants to hear and identify. These algorithms can be linear or nonlinear, meaning that a linear or convolutive model for their behavior will not always suffice.

Noise cancellation algorithms may seek to remove any non-speech sounds. Specifically, if sound seems to come from multiple pitches (which few speaking humans can produce), the noise-cancellation algorithm might eliminate sounds that appear to be derived from the weaker pitch. Therefore, the characteristic matrix algorithm should not rely too heavily on identifying weaker harmonics that could be noise cancelled out.

Distortions Due to Codecs and Quantization

Audio is often transmitted in compressed form to reduce the cost or increase the speed of transmission, or purely by convention. The codec that compresses the audio may use psychoacoustic encoding, as in MP3 and similar algorithms, in which some audio quality is lost, but not in a way that specifically hurts music or speech. The codec might also be a speech codec designed to pass only sounds that can be well parameterized as speech. Speech codes may introduce significant nonlinear distortions to music audio, removing components that cannot be identified as speech-like, while including and even amplifying other spurious components that the codec considers to be speech-like. Depending on the type of quantization used in the codec, there may be distortions in the magnitude of frequency components, an addition of white noise, or both.

If a speech codec is used in the system, it will try to pass only information that is necessary to understand speech. Specifically, the phonetic and prosodic information that characterizes what human listeners recognize as speech tends to be encoded via rapidly updated spectral contour and pitch information. This can only be reliably passed as harmonic signals with approximately correct spectral shape. Therefore, the loudest harmonic peaks and their relative strengths should survive the codec distortion, and a characteristic matrix that captures this information will be more robust. Also, fricatives such as "f" and "sh" will typically be encoded as a stochastic component with much energy at the upper end of the above-noted frequency range.

Transmission Errors.

Telephony and data networks 115 do not have perfectly consistent connectivity or data rates, and as a result the transmitted signal may include gaps or lower quality segments.

Transmission errors may provide particularly challenging. At the very least a characteristic matrix should not break down over a larger time period than any unintended silences in the query audio. Also, the characteristic matrix should degrade gracefully, so that if a lower bitrate is temporarily used, at least the information passed will still be something the characteristic matrix can use.

A characteristic matrix should reliably detect short term frequency peaks (in a representation such as the hopped, windowed FFT.) It should be able to tell which of those peaks are loud enough to be considered important and audible (though not fall victim to peaks' relative loudness changing somewhat.) It should detect these peaks in the typically used speech frequency band, it may benefit from using energy information at the upper end of this band. And, it should not be affected over an excessive time or frequency range by background noise or transmission errors. The filterbank and characteristic matrix representations described below address these requirements.

Alignment of Query and Reference Sounds

Before moving on, we describe a particular challenge which may be viewed as less than one of the distortions of the query audio, and rather one of how the query interacts with the fingerprinting. In the characteristic matrix system described herein, we will break up audio into chunks that last about a tenth of a second at a time, and update those chunks every one twentieth of a second. This leads to the question: what if the query is processed so that the first chunk of audio we take is exactly 50% off of the chunks in the matching query? For example, consider if the lead vocal in a reference begins right at the start of a chunk at 10.1 sec. If the query starts its first chunk just before that, so that the vocal comes in half way through the chunk, then this chunk and all subsequent ones will not line up. In this case, none of the chunks will appear to match, because none of them will line up. We have developed at least three ways to deal with this issue.

First, various offsets are used by choosing offsets for the first frame when creating a characteristic matrix for the query. For example, make a first characteristic matrix so that the first frame starts at the first sample in the recording. But also make a second version of the characteristic matrix whose first frame begins one half of the characteristic matrix hopsize into the recording. Note also that we could use various divisions of the hopsize, and that we need not initially search all offset versions of the query characteristic matrix initially; we could save these versions for refining scores or a final matching stage.

Second, sufficiently long chunks (frames) are chosen. This mitigates the extent to which a very short time event can dominate a single frame, because the rest of the frame will contain other events. By ensuring sufficiently long frames, we are likely to have fewer frames that are substantially different when they do not line up exactly.

Third, "wide" frequency peaks are allowed. When identifying peaks in the FFT, it is preferred to allow some leeway when describing peak frequency. This may not be intuitive, because peaks in the FFT generally indicate the detection of a stable frequency. In practice, however, the strongest harmonics often come from voice signals, which often smoothly change frequency versus time during pitch transitions and vibrato, which leads to wider peaks and different peak frequencies at different times. Therefore, if we ascribe some minimum width to detected frequency peaks, we can actually allow slightly misaligned frames to show similar or identical peak frequencies.

We combine these approaches to varying degrees in the characteristic matrices described below. The last of these three, allowing some flexibility in peak detection, is something facilitated by our choice of filterbank spacing. We next consider that aspect of the characteristic matrix.

Filterbank Module

In many applications, filterbanks are used to capture general spectral shape, as that encodes such information as instrumental timbre or speech phoneme. For our disclosure, we capture individual spectral peaks, without excessive frequency precision.

Figure 2:
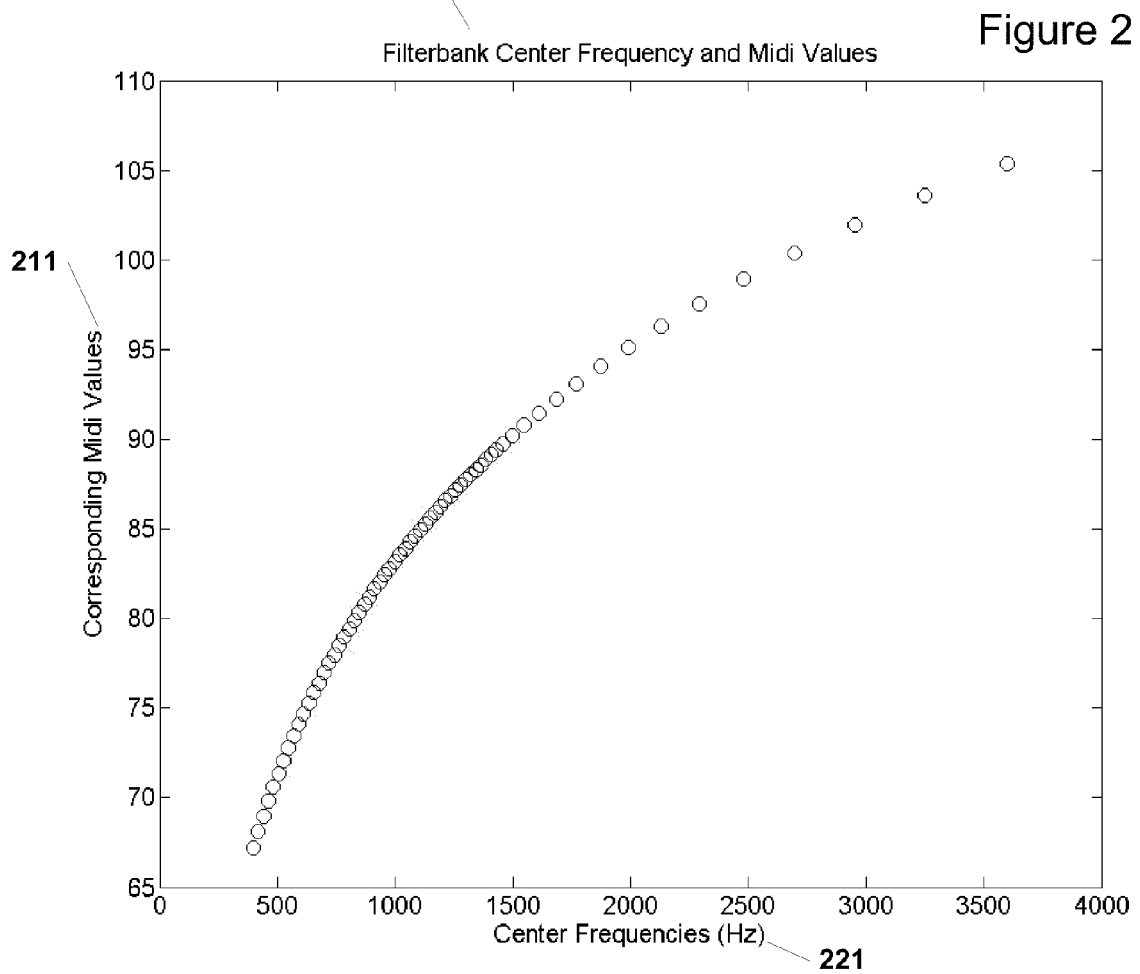
FIG. 2 depicts these filterbank center frequencies.

FIG. 2 depicts these filterbank center frequencies 201. The plot shows, on the horizontal axis, the center frequencies 221 used. On the vertical axis, the corresponding midi value 211 for a pitch at the center frequency specified is depicted.

There are certain practical issues about spectral peaks. For instance, at higher frequencies, due to pitch variation, peaks often appear wider in the FFT. Therefore, it can be difficult or impossible to capture peak information at higher frequencies. At the same time, higher frequencies contain other general energy information that tends to pass a speech codec that could be useful in identifying musical sounds such as percussion. Therefore, we have chosen more widely spaced filterbank center frequencies at higher frequencies. At the lower frequencies, uniform spacing of filters may be used, because FFT peak widths are influenced more by the window transform (the spectral shape that an ideal sinusoidal peak forms based on the FFT windowing function) rather than pitch variation. Pitch variation will have less bearing on peak detection. For these reasons, one filterbank that we apply (with standard triangular filters) has the following center frequencies (in Hz):
396.5 418.0 439.5 460.9 482.4 503.9 525.4 546.9 568.4 589.8 611.3 632.8 654.3 675.8 697.3 718.8 740.2 761.7 783.2 804.7 826.2 847.7 869.1 890.6 912.1 933.6 955.1 976.6 998.0 1019.5 1041.0 1062.5 1084.4 1105.5 1127.0 1148.4 1169.9 1191.4 1212.9 1234.4 1255.9 1277.3 1298.8 1320.3 1341.8 1363.3 1384.8 1406.3 1428.1 1458.6 1498.5 1548.3 1609.1 1681.9 1768.3 1869.8 1988.6 2127.2 2288.7 2476.6 2695.6 2950.9 3249.1 3598.1

The filterbank module takes as input an audio signal x representing either a query or a reference. We will generally assume that this signal is a waveform with values between −1 and 1, or can readily be converted to such a signal.

It creates as an output a special perceptual filterbank representation of the input audio.

Figures 3, 4:
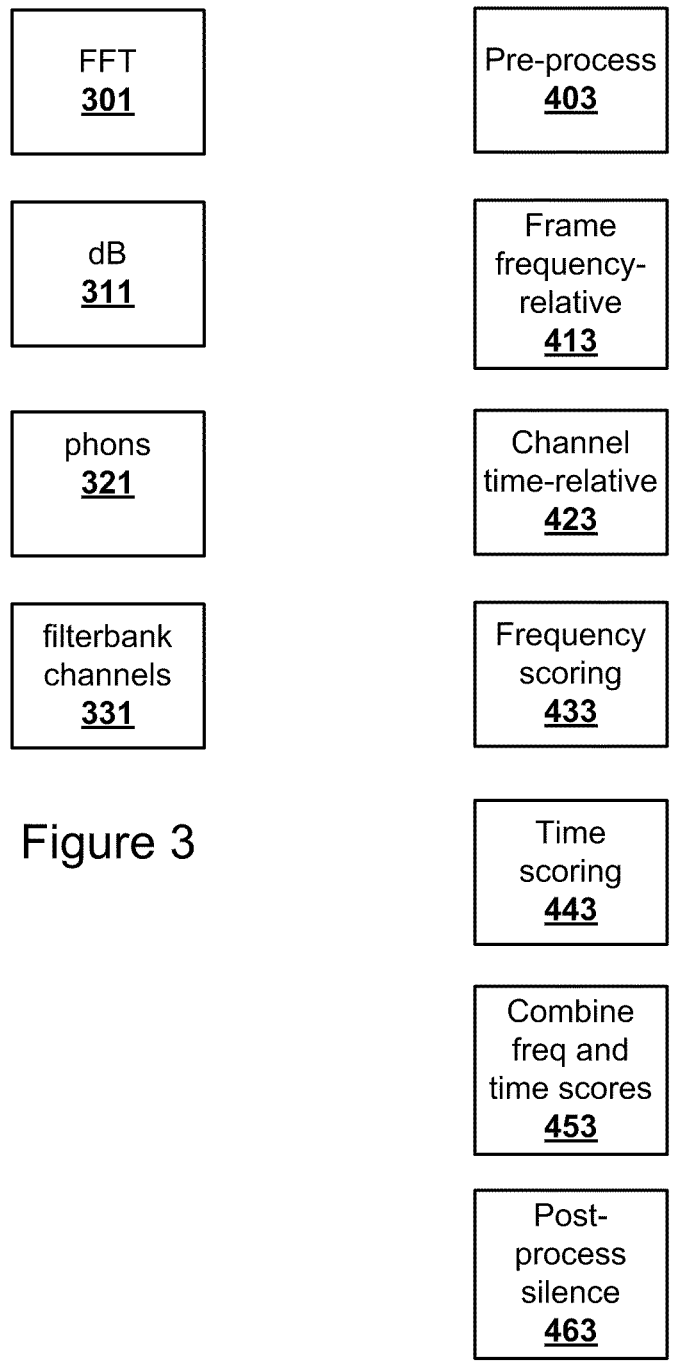
FIG. 3 depicts module inputs and outputs.
FIG. 4 depicts the method of producing a characteristic matrix by processing of the same data from the filterbanks.

Module Operation:

FIG. 3 depicts module inputs and outputs. The module begins by forming a hopped, windowed FFT 301 representation of the input audio signal. We call this representation X(k,l) where k is the frequency bin and l is the frame number versus time. The window length used is 100 ms, though lengths as short as 50 ms or as long as 200 ms could be advised. The hopsize used is generally 50% of the window length, though 25% or 100% could be used.

Once the spectrogram representation has been created, the magnitudes |X(k,l)| will have a maximum value of 1.0. This maximum reflects that x ranged in value from −1 to 1 and that by convention normalized FFT windows are used. We next convert the magnitude spectrogram values to dB 311 as follows:

$$X_{dB} = 20 \cdot \log_{10}(|X(k,l)| + \epsilon)$$

where $\epsilon$ is a very small numeric value included to prevent taking the log of zero. Given that the maximum value of the FFT was 1, the maximum value of the dB representation is 0, and the minimum is a negative number limited by $\epsilon$.

Next, to facilitate conversion to a perceptual scale, we add 110 to existing $X_{dB}$ values:

$$X_{dB} = X_{dB} + 110$$

which generally brings them into a positive range. This is done to simulate dB SPL (sound pressure level), a representation of how loud sound is in the real, physical world. The quantity dB SPL measures the magnitude of sound pressure waves at a sensor, and at a frequency of 1000 Hz, sound at 100 dB SPL or more is considered very loud to a human listener. Adding 110 dB to the previous representation causes the loudest possible value to be 110 dB (simulated SPL), though this value is rarely reached in practice. The maximum value is only reached when the input x is at a maximum or minimum value for a certain period of time. Furthermore, mechanisms are typically used when making audio signals to prevent hitting the maximum input values, because doing so increases the risk of overloading the available input range, a phenomena known as clipping. On the other hand, audio signals can sometimes be very quiet, meaning that all information has a dB SPL value far below the maximum of 110 dB. This is also limited by the SNR of an analog system and the SNR and quantization of a digital system. If the audio signal has 16 bit quantization (which is a typical value), then there is no useful information more than 96 dB down from the maximum. (This is obtained by taking 20*log 10(2^16)=96.33 dB.)

In practice, a human listening to a reproduced signal will adjust the volume into a range which is easy to hear, but not so loud as to be uncomfortable. Therefore, even though we have converted the FFT to have a maximum magnitude value of 110 dB simulated SPL, we do not necessarily consider FFTs with an average peak value of 30 dB simulated SPL to be different from those with an average peak value of 70 dB simulated SPL, because a human listener might adjust the volume to be more like 50 dB SPL for either case.

This has practical implications when developing a perceptual model of the input audio. We use a curve to change the magnitudes of the input FFT to reflect phons 321, which are values that model how loud human listeners perceive sounds at various frequencies. By definition, phons values and dB SPL values are identical at 1000 Hz, but generally vary at other frequencies. For example, at the frequency 1000 Hz, a 50 dB SPL sound is said to have a level of 50 phons. But at 440 Hz, a 50 dB SPL sound is said to have a level of about 46.2 phons. Though phons curves have different shapes at different dB SPL values, we choose to always use the weighting for a dB SPL input value of 50 dB as a "happy medium" because we assume that a human listener would adjust the volume of the recording up or down to be at a comfortable level of about 50 dB. In general, then, to convert a dB SPL value to phons, we require two things in addition to the dB SPL value: the frequency at which this value occurred, and a chart derived from human listening tests that maps such values to phons. In our implementation, we assume that all inputs are at a level of 50 dB SPL. To convert to phons in our implementation then, the following steps are followed. First, the phons bonus curve is created. To do so, consider the phons values versus frequency when the input is 50 dB SPL. Some of the output values will be greater than 50 phons, and some less. We subtract 50 from these phons values to get a "phons bonus" p(k), which is positive when the phons value is larger and negative when the phons value is smaller. These values vary versus frequency bin k. For example, we may have a phons bonus of −2.01 phons at 554.7 Hz and a phons bonus of 2.99 phons at 2500 Hz. Thus, we have an individual phons bonus value for every frequency bin in the FFT. Second, the phons bonus values are added to all of the dB SPL values recorded, using the phons bonus corresponding to the appropriate FFT bin frequency. For any and all frames l, we may write:

$$X(k,l)_{phons} = X(k,l)_{dB,SPL} + p(k)$$

This is a "best mode" implementation in the sense that no judgment need be made about the input level (loud versus quiet recordings), that any frame of the input FFT sequence may be processed without seeing past or future frames, and that table lookup of individual phons bonus values versus dB SPL input need never be performed. However, it is also possible to consider the actual individual dB SPL values of the input when choosing the phons bonus. This may be done if computation cost is not an issue, if we have an input whose level is known to be in some way a true indicator of perceived volume, and/or if we have no latency requirement and can determine a good normalization value to apply to some or all of the simulated dB SPL values before adding the phons bonus.

Finally, adding the phons bonus is optional, as we may simply use simulated dB SPL values.

Before moving on to the final step of applying the filterbank, we convert from phons or simulated dB SPL values back to squared magnitude values:

$$X(k,l)_{sq.mag.} = 10^{\wedge}(X(k,l)_{phons}/10)$$

or $$X(k,l)_{sq.mag.} = 10^{\wedge}(X(k,l)_{dB,SPL}/10).$$

This is done by convention; the application of the filterbank may be viewed as taking a weighted sum of values in the FFT. When adding magnitudes from different frequencies, to achieve a perceptually meaningful quantity, it is generally advised to do so in the squared magnitude domain rather than a logarithmic domain such as decibels or phons.

The last step is to apply the filterbank channels 331. This may be performed as a matrix multiplication if we have all the frames, or on an individual frame level. To state this as a matrix multiplication, we may describe the filterbank as a matrix F(c,k), which has a total of C channels, each of which has values for each frequency bin k out of a total of K. To obtain the filterbank representation, then, we perform:

$$X(c,l)_{filterbank} = F(c,k)X(k,l)_{sq.mag.}$$

which is the multiplication of a C×K matrix by a K×L matrix to generate a C×L matrix. To apply the filterbank one frame at a time we may consider L to be 1, in which case we multiply a C×K matrix by a K×1 vector to generate a C×1 vector.

Module to Create Characteristic Matrices from Filterbank Data

Module Inputs and Outputs:

This module uses as input the special perceptual filterbank representation of the input audio described above.

It produces a binary array of the same dimensionality as the filterbank representation. Roughly speaking, a one in this representation represents a value that is louder than its neighbors in time and/or frequency.

Module Operation:

FIG. 4 depicts the method of producing a binary array of the same dimensionality as the filterbank representation. This module proceeds with seven operations, pre-processing 403, processing a single frame at a time to see relative frequency loudness 413, processing a single filter's data at a time to see relative time loudness 423, post-processing of the single frame at a time data 433, post-processing of the single filter at a time data 443, combining information from the above two types of processing 453, and post-processing the combined characteristic matrix 463.

(1) Pre-Processing

The module begins by converting the squared magnitude of the filterbank representation to dB. This may be written as:

$$X(c,l)_{dB\text{-}filterbank} = 10 \cdot \log_{10}(X(c,l)_{filterbank})$$

Next, we smooth the filterbank representation versus time to help remove bias from the FFT, for instance when frequency components collide due to chosen window types and lengths. (This bias produces misleading and inconsistent values for the frequencies and magnitudes of peaks in the FFT. As noted above, the peaks are useful in our representation, so we wish to reduce the bias. Above, we created a filterbank representation, which itself performed smoothing versus frequency, helping to compensate for bias in the FFT. Similarly, we reduce bias by smoothing versus time.) In our system using 100 ms frames with 50 ms hopsize, the smoother used is [0.15 1.0 0.15] (which is divided by 1.3 to normalize the smoothing). This smoother is applied to the data at each frequency value in the filterbank, and represents smoothing over three time frames whose central values are a total of 100 ms apart. Useful smoothing could smooth over a time range of 50 to 200 ms; any variety of standard windows such as Blackman, Kaiser, or Hamming could be used.

(2) Processing One Frame at a Time

This part of the processing considers one frame of the filterbank data at a time. If there are 64 filters in the filterbank, and 1000 frames of the filterbank data, then this part of the system considers 64 values at a time, and does so 1000 times.

For each frame, the system creates a version of a masking curve, such as has been described in advanced codecs. However, in this case the goal is not to identify sounds which might not be perceived by a human so much as sounds that are most likely to survive processing by psychoacoustic and noise cancelling codecs. For sound matching, the otherwise useful functions of the codec introduce distortion and noise to channels that a query is likely to pass on its way to a matching engine. The issues of human perception and codec behavior are, of course, related. It would be difficult to catalog codecs and discern what information they eliminate when they process sound, because different codecs may place different emphasis on sound quality or bit rate, or may be tailored to specific input such as voice. Therefore, we address the sound information preserved by the codecs rather than the information eliminated. We expect that the loudest, most human-perceptible sounds will be preserved by a generic codec.

Figure 5:
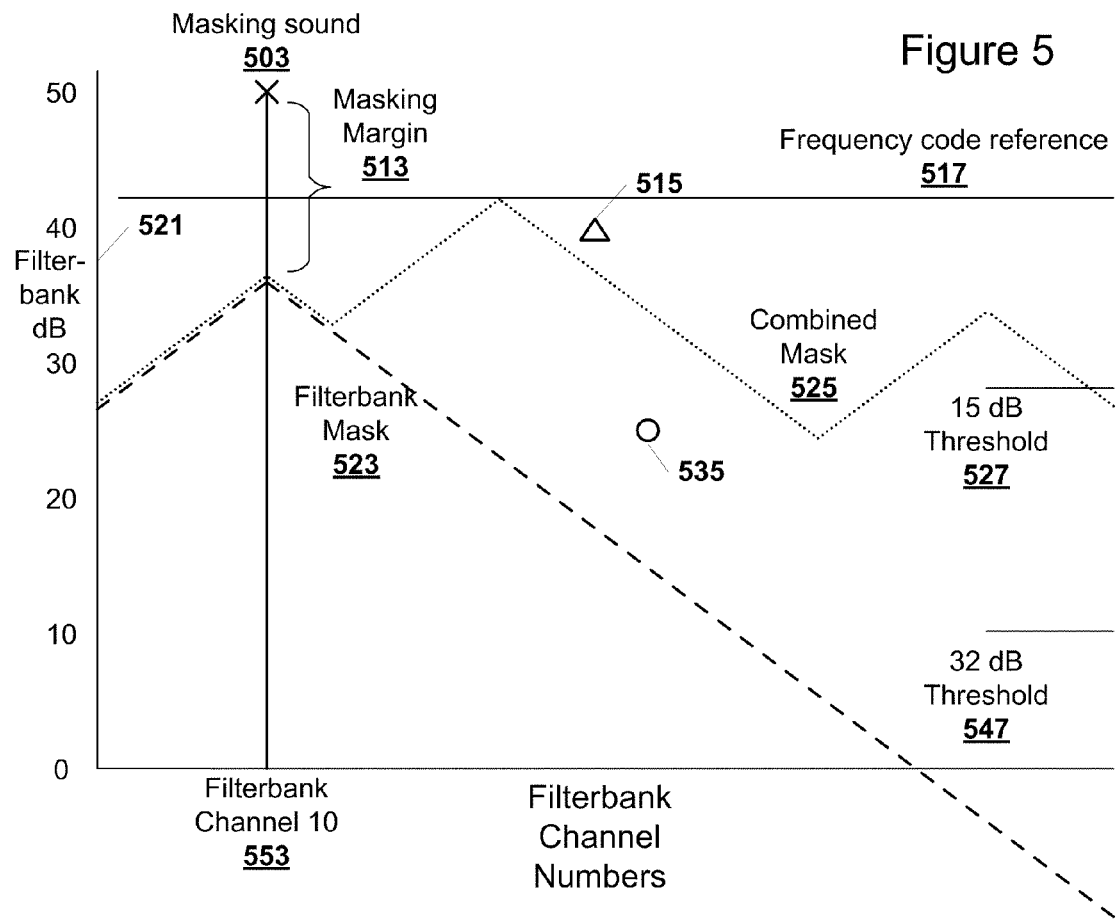
FIG. 5 illustrates a filterbank masking curve for sounds that are expected to be preserved by perceptual encoding codecs.

FIG. 5 illustrates a filterbank masking curve 523 for sounds 503 that are expected to be preserved by codecs. We consider the data in filterbank channels 553, rather than FFT bins. For each channel, we effectively draw diagonal lines down and away from the data value, starting at some fixed point below that value, a so-called masking margin 513. For example, say there is a value of 51.0 dB in filterbank channel 10. In one implementation, the fixed value down from the data is 15 dB and we use a diagonal slope down of 1.0 dB per filterbank channel. In that case, the 64 values for the masking curve based on the value of 51.0 dB in filterbank channel 10 would be:

28 29 30 31 32 33 34 35 36 35 34 33 32 31 30 29 28 26 25 24 23 22 21 20 19 18 17 16 15 14 13 12 11 10 8 7 6 5 4 3 2 1 0 −1 −2 −3 −4 −5 −6 −7 −8 −9 −10 −11 −12 −13 −14 −15 −16 −17 −18

In this case, some of the numbers are negative, though we will see that this is of no consequence. We create similar curves based on every one of the 64 data points. Once all 64 curves are obtained, we take a max function $M_F(c,l)$ of the 64 curve values at all 64 filter frequencies. For example, at the 10th frequency value, the above data shows the curve to be at 36 dB. However, there are 63 other curve values at bin 10. If there was a very loud filterbank value at filter 20, of say 70 dB, then at bin 10 its curve would show a value of 45.0 (which we obtain as 70−15−1.0*10=45.0). Therefore, when we take a max function, the value at bin 10 would be at least 45.0, depending on the other 62 curve values. We call the values of this max function the combined mask 525. We depict a combined mask with three controlling peaks, on of which is at channel 10. For clarity, we have offset this combined mask just above the individual filterbank mask for channel 10.

Once the combined mask has been calculated, we may calculate how far above this mask the actual filterbank data is, if it is above the combined mask value at all. We may write this distance above the combined frequency mask:

$$A_F(c,l) = X(c,l)_{dB\text{-}filterbank} - M_F(c,l)$$

It should be clear that the maximum channel dB value above the combined mask is 15.0 dB 527, because each point in the combined masking curve is only 15.0 dB below channel dB value. Generally speaking, music and voice tend to have peaks in their FFT (and in this filterbank) representations, meaning that some spectral values will be much higher than others. Therefore, $A_F(c, l)$ will often be negative. In FIG. 5, sounds with magnitudes above and below the combined mask are indicated by a triangle 515 and circle 535, respectively.

(3) Processing One Channel at a Time

The system performs a similar processing versus time, in which a combined time mask is created. In this case, the system considers each filterbank channel separately, and considers a zone of several frames at a time within that channel for each time frame. Above, when creating frequency masks, we considered any one of the 64 filterbank channels to affect all of the 64 channels. In the current case of data versus time, however, the analogue is not practical or desired, because it would require that data at a given time instant create a mask that affects all other time instances: past, present, and future. Therefore, we define a zone of time before and after any given point within which the current point may affect the time mask.

Otherwise, the idea behind the time mask is the same as behind the frequency mask: we wish to reflect that some data is much louder than other data, and therefore more likely to be passed by the various noise and processing described above.

Figure 6:
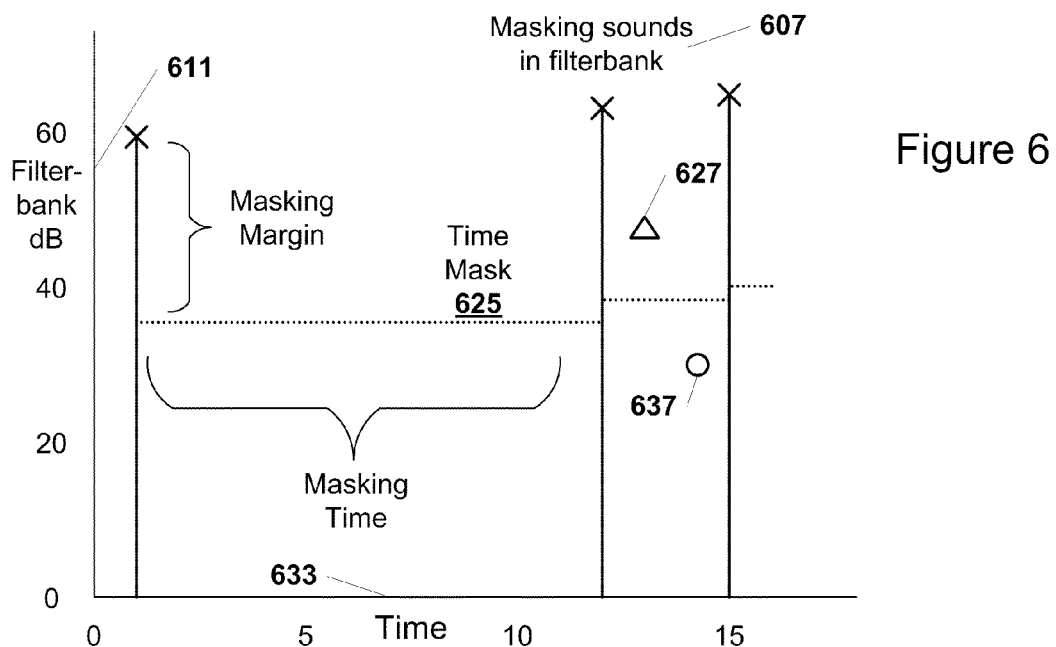
FIG. 6 illustrates how a system allows the loudness in a particular filterbank of a given frame to affect the time mask for a zone of several frames after.

FIG. 6 illustrates how a system allows the loudness in a particular filterbank 611 of a given frame to affect the time mask 625 for a zone of several frames. In one implementation, a masking sound 607 affects only about 10 frames following the current frame. In this case, the mask value is 25 dB below that of the current frame.

To illustrate, consider the 1st through 15th frames in a filterbank channel to have the following dB values and time mask contributions:

| 60 | 55 | 54 | 55 | 55 | 55 | 56 | 56 | 58 | 59 | 59 | 60 | 62 | 62 | 63 |
|----|----|----|----|----|----|----|----|----|----|----|----|----|----|----|
| 35 | 35 | 35 | 35 | 35 | 35 | 35 | 35 | 35 | 35 | 35 | 0  | 0  | 0  | 0  |
| 0  | 30 | 30 | 30 | 30 | 30 | 30 | 30 | 30 | 30 | 30 | 30 | 0  | 0  | 0  |
| 0  | 0  | 29 | 29 | 29 | 29 | 29 | 29 | 29 | 29 | 29 | 29 | 29 | 0  | 0  |
| 0  | 0  | 0  | 30 | 30 | 30 | 30 | 30 | 30 | 30 | 30 | 30 | 30 | 30 | 0  |
| 0  | 0  | 0  | 0  | 30 | 30 | 30 | 30 | 30 | 30 | 30 | 30 | 30 | 30 | 30 |
| 0  | 0  | 0  | 0  | 0  | 30 | 30 | 30 | 30 | 30 | 30 | 30 | 30 | 30 | 30 |
| 0  | 0  | 0  | 0  | 0  | 0  | 31 | 31 | 31 | 31 | 31 | 31 | 31 | 31 | 31 |
| 0  | 0  | 0  | 0  | 0  | 0  | 0  | 31 | 31 | 31 | 31 | 31 | 31 | 31 | 31 |
| 0  | 0  | 0  | 0  | 0  | 0  | 0  | 0  | 33 | 33 | 33 | 33 | 33 | 33 | 33 |
| 0  | 0  | 0  | 0  | 0  | 0  | 0  | 0  | 0  | 34 | 34 | 34 | 34 | 34 | 34 |
| 0  | 0  | 0  | 0  | 0  | 0  | 0  | 0  | 0  | 0  | 34 | 34 | 34 | 34 | 34 |
| 0  | 0  | 0  | 0  | 0  | 0  | 0  | 0  | 0  | 0  | 0  | 35 | 35 | 35 | 35 |
| 0  | 0  | 0  | 0  | 0  | 0  | 0  | 0  | 0  | 0  | 0  | 0  | 37 | 37 | 37 |
| 0  | 0  | 0  | 0  | 0  | 0  | 0  | 0  | 0  | 0  | 0  | 0  | 0  | 37 | 37 |
| 0  | 0  | 0  | 0  | 0  | 0  | 0  | 0  | 0  | 0  | 0  | 0  | 0  | 0  | 38 |

As before, to obtain the combined time mask, which we call $M_T(c,l)$, we take a max function of the contributing masks. In this case, based on data points, our combined time mask for frames 1 through 15 would be

| 35 | 35 | 35 | 35 | 35 | 35 | 35 | 35 | 35 | 35 | 35 | 35 | 37 | 37 | 38 |
|----|----|----|----|----|----|----|----|----|----|----|----|----|----|----|

This process is repeated for all frames in the file. It should be clear that in this system, once we have processed a given frame, the combined mask for all frames before that frame is then known. (Note that in implementations where the time mask is influenced by frames in the future this does not hold; in that case, the combined mask is not known until after all frames influencing the current frame have been processed.)

As before, once the combined mask has been calculated, we may calculate how far above this mask the actual filterbank data is, if it is above the combined mask value at all. We may write this distance above the combined time mask:

$$A_T(c,l) = X(c,l)_{dB\text{-}filterbank} - M_T(c,l)$$

It should be clear that the maximum value above the combined mask in our setup is 25.0 dB, because the masking curve generated by any given point is only that far below the point itself Generally speaking, music and voice occasionally have loud, percussive events versus time. Therefore, after loud events, $A_T(c,l)$ will often be negative. In the figure, sounds with magnitudes above and below the combined time mask are indicated by a triangle 627 and circle 637, respectively.

(4) Post-Processing Versus Frequency

After processing one frame at a time and one filter at a time, we have two sets of data in $A_F(c,l)$ and $A_T(c,l)$ that respectively tell us how far above the masks $M_F(c,l)$ and $M_T(c,l)$ the dB filterbank data is. We next revisit the data in the combined frequency mask, $M_F(c,l)$.

Again, we process the data frame by frame, considering all frequencies in a frame $l_0$ together. This time, the goal is to identify peaks in the mask itself (rather than the filterbank data), and to see how close to the frame's maximum $M_F(c,l_0)$ value they were. The logic here is that weaker peaks in the filterbank data will fall below the combined mask curve, and therefore not be peaks in the combined frequency mask. The system first detects all peaks in the frequency mask for the frame, with this simple definition: a peak occurs if the value is greater than the left neighbor (one frequency filter to the left) and greater than or equal to the value of the right neighbor (one frequency filter to the right). After peaks have been identified this way, a peak flags array $O(c,l_0)$ is created that labels peaks as occurring at the filter of the peak, as well as one filter to the left and one to the right. That is, if there is a peak at filter 13 in frame 100, we have $O(13,100)=1$, and also $O(12,100)=1$ and $O(14,100)=1$. The idea here is that FFT bias, as well as misalignment of frames, can lead to peaks being slightly off in frequency for two recordings of the same audio. By allowing the peak to be identified over three filters, these problems are mitigated.

The next step is to label these peaks as loud, intermediate, or quiet based on how loud they were compared to the maximum $M_F(c,l)$ value in the frame. For coding purposes, we also assign a code to each situation. The table below shows thresholds and what we call "frequency codes":

| $O(c, l_0)$ Peak Flag | Level of $M_F(c, l_0)$ | Frequency Code |
|---|---|---|
| 1 | at least max($M_F(c, l_0)$) - 15.0 | 1 |
| 1 | below (max($M_F(c, l_0)$) - 15.0) and at least (max($M_F(c, l_0)$) - 32.0) | 2 |
| 1 | below (max($M_F(c, l_0)$) - 32.0) | 4 |
| 0 | at least max($M_F(c, l_0)$) - 15.0 | 3 |
| 0 | below (max($M_F(c, l_0)$) - 15.0) and at least (max($M_F(c, l_0)$) - 32.0) | 3 |
| 0 | below (max($M_F(c, l_0)$) - 32.0) | 4 |

In FIG. 5, the highest peak would be coded 1,1, for its peak flag and frequency code 517. The other two peaks, both above the 15 dB threshold, would be coded 1,2. The triangle sound might be coded 1,2 and the circle coded 0,3, depending on the values of left and right neighbors that are not illustrated in the figure.

We note that other values than 15.0 and 32.0 547 for the thresholds below the maximum could be used. These are values that generally work well, though values from 5 to 20 dB for the first parameter, and 25 to 40 for the second parameter would also be reasonable.

(5) Post-Processing Versus Time

The system next processes the data in $A_T(c,l)$ that tells us how far above the mask $M_T(c,l)$ the dB filterbank data is. Again, the idea is to reflect how far below the combined time mask the filterbank data is. We assign "time codes" as follows:

| Level of $A_T(c, l)$ | Time Code |
|---|---|
| At least 24.0 | 1 |
| Above 6.5 and below 24.0 | 2 |
| At most 6.5 | 3 |

In FIG. 6, the masking sounds would be coded 1. The triangle and circle sounds would be coded 2 and 3, respectively.

(6) Combining the Two Types of Data Above

We can now generate the first version of the output characteristic matrix based on the time and frequency codes used in the tables above.

| Frequency Code | Time Code | Characteristic matrix value |
|---|---|---|
| 1, 2, or 3 | 1 | 1 |
| 1 or 2 | 2 | 1 |
| All other combinations | | 0 |

(7) Post-Processing to Deal with Silence

At this point, the main processing is done. We observe that because the system identifies significant sounds as those louder than neighbors in time and frequency, that silence presents a special case. In silence, time and frequency maxima lose meaning, and all points qualify as "loud," leading to characteristic matrices that are all ones for most of the silent frames. One way to address this circumstance is to apply a post-processing rule: if any three consecutive frames have characteristic matrices of all ones, set the first such frame to be all zeros. In practice, we found that requiring anywhere from three to ten frames to pass this test is reasonable. Also, in some situations, it is useful to deactivate this post-processing.

Module to Score a Query Against a Reference

This module compares a query and a reference, computing a score which, casually speaking, represents "how nearly the query matches the reference". The scores are not necessarily meaningful on an absolute scale (that is, they are not necessarily meaningful outside the context of a particular query). However, when such scores are computed by comparing a particular query to many or all of the references in the database, the resulting scores can be used to decide which reference(s) most likely match the query.

Module Inputs and Outputs:

This module accepts several inputs, including: a set of characteristic matrices for the query (as produced by the preceding module), a characteristic matrix (as produced by the preceding module) for a given reference in the database of searchable content or an enumeration of query-to-reference alignments to consider. If the last input is not given, it is assumed that "all possible" alignments should be considered.

It outputs a score that represents "how well the query/reference match each other". Various other numeric values are computed in the process of computing the final score, and these values can also be useful outside the context of the present module.

Module Operation:

Few examples of exemplary characteristic matrices query and reference are included. We will use a characteristic matrix dimensionality of only 8, though this value would generally be much higher in practice, for instance 64. In this simplified example, the characteristic matrices represent values from only 8 filterbands. In this example, we use a query characteristic matrix of four frames and a reference characteristic matrix of 10 frames.

In the following characteristic matrices, each column represents a new frame (time progresses from left to right) and each row represents a different frequency. Thus, when we refer to "frame 3" we mean "the eight values in column number 3". We refer to these columns/frames in a 0-indexed form (counting 0, 1, 2 . . . ), so "frame 3" is in the "fourth column".

Example Reference Characteristic Matrix (R1):

$$\begin{matrix} 0 & 0 & 0 & 0 & 1 & 0 & 0 & 1 & 1 & 0 \\ 0 & 0 & 0 & 0 & 1 & 0 & 0 & 0 & 1 & 0 \\ 0 & 0 & 0 & 0 & 1 & 0 & 0 & 0 & 0 & 0 \\ 0 & 0 & 0 & 1 & 1 & 0 & 0 & 0 & 0 & 0 \\ 0 & 0 & 0 & 1 & 1 & 0 & 0 & 1 & 1 & 1 \\ 0 & 0 & 0 & 0 & 1 & 1 & 1 & 1 & 0 & 0 \\ 0 & 1 & 0 & 0 & 0 & 0 & 0 & 0 & 0 & 0 \\ 0 & 0 & 0 & 0 & 0 & 1 & 0 & 0 & 0 & 0 \end{matrix}$$

Example Query Characteristic Matrix (Q1):

$$\begin{matrix} 0 & 0 & 0 & 0 \\ 0 & 0 & 1 & 0 \\ 0 & 0 & 1 & 0 \\ 0 & 1 & 1 & 0 \\ 0 & 0 & 1 & 1 \\ 0 & 0 & 1 & 1 \\ 0 & 0 & 0 & 0 \\ 0 & 0 & 0 & 1 \end{matrix}$$

FIG. 7 depicts the method for computing a score. The overall module operation includes the following phases. Create an alignment score 705 for every available alignment. In the simplest case, one alignment is specified, so only one alignment score is created. Another option is to compute additional possible scores for the top-score alignments, using queries with different framing 715 of the input sound. Return the maximum computed alignment score 725 as the overall match score between this query and reference.

Phase (1)

Let's assume the given alignment is A=1. This represents a hypothesis that frame 0 in the query corresponds to frame 1 in the reference, that frame 1 in the query corresponds to frame 2 in the reference, etc. (that in general frame N in the query corresponds to frame N+A in the reference).

This means that we have four (query-frame, reference-frame) pairs that correspond for this alignment. We will proceed to compute a frame score for each pair, and we will then average these scores to create an overall score for this alignment.

The frame score can be computed in a number of ways which are all roughly equivalent. In each case, the first step is to compare each Boolean value in the query frame one-by-one with its corresponding Boolean value in the reference frame. Since there are two Boolean values involved in each such comparison, there are four possible outcomes, which by convention we label as follows:

If the query value is 1 and reference value is 1, we call this a "white_hit".

If the query value is 0 and the reference value is 0, we call this a "black_hit".

If the query value is 1 and the reference value is 0, we call this a "white_miss".

If the query value is 0 and the reference value is 1, we call this a "black_miss".

For our current example, then, the 8 values for frame 0 of the query are "00000000" while the 8 values for frame 1 of the reference are "00000010" (that is reading the values from the second column of the reference from top to bottom). This means that there are 0 white_hits, 7 black_hits, 0 white_misses, and 1 black_miss. Similarly, for the final frame of the query (frame 3), the query values are "00001101" and for the corresponding reference frame (frame 4), the reference values are "11111100" so for this comparison there are 2 white_hits, 1 black_hit, 1 white_miss, and 4 black_misses.

The next step is to derive a frame score from some subset of these four counts. In general, white_hits and black_hits are "good" (that is, they suggest a match), while white_misses and black_misses are "bad" (that is, they suggest a non-match). So a naïve approach would be to simply add the number of white_hits and black_hits, which would yield a score between 0 and 8 for every frame.

It is often advantageous, however, to use a more involved linear combination such as 1.16*white_hit_count+black_hit_count, which rewards white_hits more than black_hits. Note that this particular formula would yield a frame score between 0 and F_max for each frame where F_max is the maximum possible score for that frame and depends on the query characteristic matrix (ranging, for instance between 8 when the query frame is all 0's to 8*1.16=9.28 when the query is all 1's).

Another option would be to extend the formula above such that the frame score is defined as F_max−(1.16*white_hit_count+black_hit_count). With this approach the maximum frame score is always 0 and the score becomes progressively more negative with every miss that is present. This formula is equivalent, then, to the following simplified formula: −1.16*white_miss_count−black_miss_count. This approach (where zero is the best possible frame score for every frame) is essentially equivalent to the proceeding approach but is, in our opinion, preferable for it's intuitive (ie, human-readable) characteristics.

Returning to our example, then, and using the formula above, the frame score for frame 0 is −1.16*0−1=−1. The frame score for the final frame (frame 3) is −1.16*1−4=−5.16. Completing this scoring for the other two frames in this alignment (A=1) gives us the following four frame scores: −1 (based on "00000000" vs. "00000010"), −1.16 (based on "00010000" vs. "00000000"), −3.48 (based on "01111100" vs. "00011000"), and −5.16 (based on "00001101" vs. "11111100"). Thus, the overall alignment score (average of the four frame scores) is: (−1−1.16−3.48−5.16)/4=−2.7.

We then proceed to calculate alignment scores for the remaining alignments. For instance, for alignment A=2 (meaning frame 0 of the query corresponds to frame 2 of the reference) the frame scores are much better: 0 (based on "00000000" vs. "00000000"), −1 (based on "00010000" vs. "00011000"), −1 (based on "01111100" vs. "11111100"), and −1.16 (based on "00001101" vs. "00000101"). Thus, for the alignment A=2 the overall alignment score is (0−1−1−1.16)/4=−0.79.

As noted previously, this module takes as optional input an enumeration of alignments to consider. If, for example, such an enumeration was given and contained only the two alignment analyzed above (A=1, A=2) then we would now be done with phase (1) of the module operation, and the optimal score thus far would be the score from alignment A=2.

If instead the optional enumeration of alignments was not given, we would proceed to calculate alignment scores using the method above for "all remaining alignments". For alignments (A=0, A=3, A=4, A=5, and A=6) the process is identical to the process given above for alignments (A=1 and A=2). However, alignment A=7 presents an edge case we have not yet considered: with this alignment, frame 0 in the query corresponds to frame 7 in the reference, etc, however frame 3 in the query "should" correspond to frame 10 in the reference but no such frame exists as frame 9 is the final frame. We call this edge case an "alignment with overhang". For such edge cases, we simply compute and average frame scores for the available frames: in this case that means averaging the frame scores from the three query frames which do have corresponding reference frames. This is, in fact, the primary reason we average the frame scores in the first place. Care must be taken when doing this sort of averaged scoring over alignments with "too much overhang". For instance, the score for alignment A=9 would consist of the scores from only one frame, which may be quite noisy and not particularly meaningful. As a result, it is necessary to set a limit on "how much overhang is allowed". For a query for N frames, it would reasonable, for instance, to allow at most N/4 frames of overhang. Applying this logic in the current example, alignment A=7 would be allowed but alignment A>7 would not be allowed. Finally, it is worth noting that a similar overhanging edge case exists for alignments with negative values such as A=−1. We treat this second edge case the same way as the first, thus with the N/4 rule, alignment A=−1 would be valid since there would be three frames of corresponding data to analyze, which alignments A<−2 would not be valid. Thus, in this example, the set of all valid alignments would be (A=[−1,7]) and in each case we would have either 3 or 4 frame scores which would be averaged to create the respective alignment scores.

Phase (2)

In this optional phase, we take into account any other versions of the query characteristic matrix that are available to us. For instance, as described in earlier modules, it is desirable to create multiple query characteristic matrices by processing the audio data at varying start points. This, while our example above provided query Q1, we may also have been given additional characteristic matrices Q2, Q3, and Q4. In most cases these additional characteristic matrices will be very similar to the first, and thus the corresponding alignment scores will be generally similar.

In phase (1) we computed the "top alignments" based on alignment score. Let's assume the top alignments were A=2 and A=6, and that we have configured phase (2) to analyze the top 2 alignments from phase (1). We would then compute an alignment score using Q2, R, and alignment A=2 following the same approach as in phase (1)—the only difference being the use of Q2 instead of Q1. If the resulting alignment score is better, we would update our maximum alignment score accordingly.

Note, when executing phase (2) it may be necessary to subtract 1 from the alignments used for certain versions of the query. For instance, let's imagine Q1 was created by processing the query data starting from "frame 0", while Q2 was created by processing the data starting from "frame 0.25" (this is, starting the first frame of Q2 from what would have be 25% of the way through the first frame in Q1), etc, such that Q4 was created by starting from "frame 0.75". When, based on calculations from Q1, we know the best alignments are A=2 and A=6, we then want, when considering another version of the query Qn, to use the two alignments that "are most similar to using A=2, A=6 for Q1". Thus, when considering Q2, if we use A=2, this is equivalent to "using Q1 with an alignment of A=2.25" which is clearly our best option. However, when considering Q4, if we use A=2, this is equivalent to "using Q1 with an alignment of A=2.75" where it would be better to use Q4 with an alignment of A=1, as this is equivalent to "using Q1 with an alignment of A=1.75" which is most similar to using Q1 with alignment A=2.

Phase (3)

In phase (3) we simply select the maximum available alignment score (compute either in phase (1) or phase (2)). It may also be useful to return the alignment value, A, that corresponds to the best alignment, as well as which version of the query, Qn, yielded the best alignment (this value can be thought of as a 'micro-alignment').

Using Returned Match Data to Align Queries with Temporally Rich Media

In the proposed system, a returned result includes an identifier of a song or sound and an indication of the best alignment within the matched reference. The identifier can include, implicitly or explicitly, title, artist, or album data. For example, a code of A123456 might encode the song "Dance Love Baby" by "Joe Blow" on the album "Love Dances."

The indication of the best alignment within the matched reference can be termed as the alignment offset. As a matter of convention, we will indicate the match as how many frames into the reference the beginning of the query appears to be. For example, the best match might occur such that beginning of the query best aligns with the 1400th frame of the reference. At 20 frames per second, this would be 70 seconds in to the reference.

By combining the above two pieces of information, we may synchronize time-labeled streamed media with the query. For example, if particular lyrics are known to occur 1400 frames into the example reference just above, we would know that those lyrics should match the lyrics in the query. It would be a satisfying user experience to see those lyrics displayed in synchronization with the query. Lyrics are one of many examples of temporally rich media. Lyrics occur at specific time points in a song. The exact times for each lyric may be known either from human annotation or machine detection. Another example can be videos. As opposed to lyrics, videos are continuously streamed. If an audio version of a song corresponds to audio for a video, a video might be shown to the user in synchrony with the query audio. Additional copies of the same song are also temporally rich media where a user might wish to play a copy of a queried song from his or her querying device or local environment. For example, a user could play a streamed or locally stored copy of "Dance Love Baby" directly from his or her mobile phone. This might be used to increase the volume of a queried song. Remixes of the same song are similar to the additional copies of the same song in concept, but with the user giving the musical environment a different feel through using a slightly different but still time-synchronized version of the song. Similarly, songs similar to the queried song are also temporally rich media when a song that complements the query song rather than an original copy or remix is used.

Any music or audio that can be synchronized in terms of melody, harmony, or rhythm with the queried audio. Existing audio systems allow music to be identified as similar based on melody (Melodis sing search, as on existing Melodis patents), harmony (as in Sapp, Craig Stuart, "Visual Hierarchical Key Analysis", ACM Computers in Enterntainment, Vol. 4, No. 4, October 2005, Article 3D, or rhythm (as in Vercoe, Barry L., et al., "CiteSeerx Music-Listening Systems", PhD Thesis, MIT Cambridge, Mass. USA 2000, and could be used to align similar music in a pleasing or interesting way to an audience. Preprogrammed lighting that matches a particular song or category of songs could be synchronized with the query.

In order for the system to succeed a number of steps occur. First, the matching reference and best matched alignment offset X is identified.

Second, we determine the total time elapsed from the beginning of the query to the time that the temporally rich media could be synchronized. This includes the duration D of the query itself, plus the time P required for processing, plus the latency L required for the network to receive and transmit information. Call this total quantity Y. That is Y=D+P+L.

Third, we have the querying device (or the environment of the agent performing the query) display or otherwise deliver the temporally rich media to arrive at time X+Y. That way, the temporally rich media (such as lyrics) will occur in synchrony with the query audio. Note that the temporally rich media may be stored on the querying device (such as in the case of querying a song the user already owns, or lyrics the user already has downloaded), or may be streamed to the device (such as in the case of lyrics the user does not yet have). Also, buffered combinations of the two models could also be used.

Due to the repetitive nature of music and other audio, the alignment offset estimate may be ambiguous. For example, if the query audio occurs during a chorus that is repeated in the reference (and possibly the query, for that matter), then each similar occurrence would be a strong candidate for a match. In such instances, one solution is to use the first matching occurrence, as this ensures that the aligned media does not stop before the end of the query. However, in situations where this would be worse than the aligned media stopping, the opposite solution could be used: choose the last matching occurrence versus time.

Network latency L may also be challenging to estimate in some situations. It is assumed that best practices to mitigate estimation difficulty would be used, such as combining multiple estimates of upload and download time to obtain the best offset for synchrony.

Module to Decide if the Top Reference is a Correct Match:

As noted earlier, the above systems create one score per reference for "the top references" however these scores are not necessarily meaningful on an absolute scale (that is, they are not necessarily meaningful outside the context of a particular query). This means that while the scores tell us which reference(s) is/are most likely a match, they don't tell us if this reference(s) is/are indeed a match.

Module Inputs and Outputs

Input includes a single score associated with each of the "top scoring references" in the database.

The output produced is a decision about whether the top reference "IS" or "IS NOT" a correct match. That is, a decision about whether we think the correct reference was indeed found in the database.

Module Operation

The operation of this module is relatively simple. If we can safely assume that the audio associated with each reference is unique (that is, each reference occurs exactly once in the database), then the following approach is sufficient:

Compare the value of the maximum score with the value of the next highest score, computing their difference. If the difference is low this suggests that two references match about as well as each other to the query and thus, since we assume they are unique, neither is likely to match the query. If, however, the difference is large, this suggests that the reference with the maximum score is a significantly better match than everything else in the database and is thus highly likely to be the correct match, especially if the database is sufficiently large. As such, it sufficient in this case to base this module's decision of whether the difference is greater than or equal to a fixed constant. For instance, we may say that if the difference is greater than 0.5 (which is units of average score per frame of the optimal alignment) we decide the top reference "IS" a match and that otherwise it "IS NOT" a match.

If it is possible for the same audio content to exist in the database multiple times, for instance passages of a well-known cover performed by multiple performers, then we must extend this approach because it is possible that the difference between the maximum and next high scores is very low and they are both the correct match. In this case, it is sufficient to decide the top reference "IS" a match whenever the difference between the Nth and (N+1)th reference scores is greater than a certain constant. We should only examine differences where N is small (such as N<5) which corresponds to an assumption that a particular reference occurs no more than N times in the database.

If no such assumption can be made about whether a reference occurs multiple times, it is then necessary for this module to perform more intelligent calculations. In such cases, creating a vector of features containing the various differences mentioned above as well as the absolute scores of the top references, plus other values mentioned throughout this document, can be a useful approach. We can then gather such data for a large number of labeled use cases (where the correct response is known) and use standard machine learning techniques to accurately map this vector of values to one of the top output states as can be done by someone familiar with the art.

Some Particular Embodiments

The technology disclosed is computer-based, whether the computer is a CPU, FPGA, digital signal processor or other processor. The technology may be embodied in a method, a device, system or article of manufacture. It is useful for processing reference sounds, query sounds or both. In some implementations, it is particularly useful for matching a query sound to one or more stored reference sounds. The query sound typically is a short sample that is matched against a longer reference.

One embodiment of the technology disclosed includes a method of creating a resilient characteristic matrix of a reference sound or a query sound. A sample processor 453 is used to repeatedly characterize the loudness of sound components grouped in filter banks 521 of sample frames. Grouping into filter banks includes a process such as described above of combining multiple bins of an FFT, for instance, that are in a particular filter band that defines the filter bank. The sample frames reside in a computer readable memory. The filter banks have a narrower frequency range and have closer mid-frequency spacing, on average, in frequencies between about 750 Hz and 1450 Hz than above 1500 Hz or below 500 Hz. The loudness peaks among the filter banks that are above cross-frequency and time thresholds in the sample frames are flagged. The cross-frequency masking threshold for a particular frame is set relative to filter band characterizations of one or more masking sounds 503. The time masking threshold for successive frames is also set relative to the filter band characterizations of the masking sounds. The masking margins 513 between masking sounds and masking thresholds 527, 547 may differ and typically will differ between the cross-frequency and time masks. The flagged peaks are coded in relation to the cross-frequency and time masking thresholds to create a frame-by-frame, filter bank-by-filter bank characteristic matrix.

In one implementation, flagging the loudness peaks above the cross-frequency and time masking thresholds avoids the inclusion in the frame-by-frame, filter bank-by-filter bank characteristic matrix of particular sound components that are likely to be eliminated from a frame sample by an auditory perception codec. Optionally, the flagged loudness peaks may be limited to filter banks in which the loudness exceeds the thresholds 527, 547. Or, flags may be applied both to peaks in filter banks in which the loudness is above the thresholds and to adjoining filter banks.

One or more filter banks can be flagged that are adjoining to a particular filter bank at which a loudness peak was flagged. Three or more peaks that are centered at about the particular filter bank can also be flagged. Similarly, five or more peaks that are centered at about the particular filter bank can be flagged. Flagging loudness peaks and adjoining filter banks effectively broadens frequency widths of the loudness peaks.

The scoring optionally may include first coding the flagged loudness peaks within the particular frame against the cross-frequency masking threshold by first bands of relative loudness. (By first coding and first bands, we mean to distinguish from second coding and second bands, without implying any order, hierarchy or relationship between firsts and seconds.) The method also includes second coding the flagged loudness peaks within the particular frame against the time masking threshold by second bands of relative loudness. The first and second coding are combined to set filter bank-by-filter bank values in the characteristic matrix. The first and second coding are repeated numerous times for the sample frames the sound. The numerous repetitions are expected to include at least 40 sample frames representing at least two seconds of a query sound and more sample frames of a reference sound, which typically will last longer than a query sound.

Characteristic matching between the query and reference characteristic matrices 117 can apply the following method, which may either extend the methods, aspects and implementations described above or which may stand on its own. In this method, reference characteristic matrices are created for numerous reference sounds and for at least one query sound. Various alignments of the query characteristic matrix are compared to at least some of the reference characteristic matrices. The comparing includes identifying filter bank-by-filter bank positive peak matches, negative peak matches, peak in query but not in reference mismatches, and peak in reference but not in query mismatches. Composite scores are derived frame-by-frame, across filter banks. The composite scores distinctly weight and also combine the positive peak matches, the negative peak matches, the peak in query characteristic matrix but not in reference characteristic matrix mismatches and peak in reference characteristic matrix but not in query characteristic matrix mismatches. The frame-by-frame composite scores are combined, for instance by summing and, optionally, normalizing, into query scores for the alignments 705. One or more best alignments of the query characteristic matrix to the reference characteristic matrices are selected. The composite scores for the best alignments are organized to identify likely query-to-reference characteristic matrix matches.

When this scoring method stands on its own, it should be understood that the characteristic matrices are created for numerous reference sounds and for at least one query sound includes creating frame-by-frame, filter bank-by-filter bank characteristic matrices for the numerous reference sounds and the query sound.

Any of the processes described can be repeated for multiple versions of the query sound and corresponding version of the query characteristic matrix. As described above, sampling of the query sound can start at various times offset from one another so that sample frames have a variety of alignments to the query sound.

Any of the methods described above can be extended to include comparing the composite scores for the best alignments and identifying a true match where one of the composite scores is significantly better than any others of the composite scores. Optionally, a best match can be reported only if it has a composite score that is significantly better than the other composite scores. Similarly, multiple best matches can be identified as identical true matches when a plurality of the composite scores match each other and are significantly better than the others of the composite scores. Again, the multiple best matches optionally can be reported only if they have a composite score that is significantly better than the other composite scores.

The methods described have corresponding devices. One device embodiment is a system that creates a resilient characteristic matrix for a reference sound or a query sound. This system includes at least a sample processor and memory coupled to the sample processor. The sample processor repeatedly characterizes loudness of sound sample frames that reside in the computer readable memory. The loudness is characterized for sound components grouped in filter banks of sample frames. Grouping into filter banks is described above. The filter banks applied by the sample processor have a narrower frequency range and have closer mid-frequency spacing, on average, in frequencies between about 750 hz and 1450 hz than above 1500 hz or below 500 hz. The processor flags loudness peaks among the filter banks that are above cross-frequency and time thresholds in the sample frames. The processor sets the cross-frequency masking threshold for a particular frame relative to filter band characterizations of one or more masking sounds. Similarly, it sets the time masking threshold for successive frames relative to the filter band characterizations of the masking sounds. The masking margins between masking sounds and masking thresholds may differ and typically will differ between the cross-frequency and time masks. The processor codes the flagged peaks in relation to the cross-frequency and time masking thresholds to create a frame-by-frame, filter bank-by-filter bank characteristic matrix data structure in the computer readable memory.

In one implementation, the sample processor avoids the inclusion in the frame-by-frame, filter bank-by-filter bank characteristic matrix of particular sound components that are likely to be eliminated from a frame sample by an auditory perception codec by flagging the loudness peaks above the cross-frequency and time masking thresholds. Optionally, the flagged loudness peaks may be limited to filter banks in which the loudness exceeds the thresholds. Or, flags may be applied both to peaks in filter banks in which the loudness is above the thresholds and to adjoining filter banks.

The processor may flag one or more filter banks that are adjoining to a particular filter bank at which a loudness peak was flagged. Three or more peaks that are centered at about the particular filter bank can be flagged. Similarly, five or more peaks that are centered at about the particular filter bank also can be flagged. Having the sample processor flag loudness peaks and adjoining filter banks effectively broadens frequency widths of the loudness peaks.

The sample processor optionally may score the peaks by first coding the flagged loudness peaks within the particular frame against the cross-frequency masking threshold by first bands of relative loudness. (By first coding and first bands, we mean to distinguish from second coding and second bands, without implying any order, hierarchy or relationship between firsts and seconds.) The processor also second codes the flagged loudness peaks within the particular frame against the time masking threshold by second bands of relative loudness. The sample processor combines the first and second coding results and uses those results to set filter bank-by-filter bank values in the characteristic matrix. The sample processor repeats first and second coding numerous times for the sample frames of the sound. The numerous repetitions are expected to include at least 40 sample frames representing at least two seconds of a query sound and more sample frames of a reference sound, which typically will last longer than a query sound.

A match processor performs characteristic matching between the query and reference characteristic matrices, either in cooperation with the sample processor or standing on its own. This match processor is coupled to a memory. It creates numerous characteristic matrices for numerous reference sounds and at least one query sound. The reference characteristic matrices typically, but not necessarily, are persisted in non-volatile memory for repeated use. The match processor processes various alignments of the query characteristic matrix against at least some of the reference characteristic matrices. The match processor identifies on a filter bank-by-filter bank basis: positive peak matches; negative peak matches; peak in query but not in reference mismatches; and peak in reference but not in query mismatches. The match processor derives composite scores on a frame-by-frame basis, across filter banks. The composite scores distinctly weight and also combine the positive peak matches, the negative peak matches, the peak in query characteristic but not in reference mismatches and peak in reference but not in query mismatches. The match processor combines the frame-by-frame composite scores, for instance by summing them and, optionally, normalizes the combined scores into query scores for the alignments. The match processor selects one or more best alignments of the query characteristic matrix to the reference characteristic matrices. It organizes the composite scores for the best alignments to identify likely query-to-reference characteristic matrix matches.

When the match processor stands on its own, it should be understood that the characteristic matrices that it creates for numerous reference sounds and for at least one query sound include frame-by-frame, filter bank-by-filter bank characteristic matrices for the numerous reference sounds and the query sound.

The match processor optionally may repeat the processing described above for multiple versions of the query sound and corresponding versions of the query characteristic matrix. As described above, processing of the query sound by a sampler into sample frames can start at various times offset from one another so that sample frames have a variety of alignments to the query sound.

Any of the devices described above can be extended by a verification processor. The verification processor compares the composite scores for the best alignments and identifies a true match where one of the composite scores is significantly better than any others of the composite scores. Optionally, the verification processor can report a best match only if it has a composite score that is significantly better than the other composite scores. Similarly, the verification processor can identify multiple best matches as identical true matches when a plurality of the composite scores match each other and are significantly better than the others of the composite scores. Again, the verification processor optionally can report multiple best matches only if they have a composite score that is significantly better than the other composite scores.

Hardware for the sample processor, the match processor and the verification processor can be shared, such as in as single FPGA or a multi-core processor or a system including multiple processors. Memory also can be shared.

The methods described above can further be embodied in computer instructions stored in a computer readable storage medium. The computer instructions can enable a processor to carry out any of the methods, embodiments, implementations, features, aspects described above. Alternatively, the computer instructions can be stored in a computer readable transport medium.

Another article of manufacture embodying the technology disclosed is a computer readable storage medium that includes computer instructions that can be used to build a system that includes one or more processors to carry out any of the methods, embodiments, implementations, features, aspects described above or to build one or more of the device embodiments disclosed. Alternatively, these computer instructions can be stored in a computer readable transport medium.

We claim as follows:

1. A method of creating a resilient fingerprint of a reference sound or a query sound, the method including:
   using a processing device, repeatedly characterizing loudness of sound components grouped in filter banks of sample frames and residing in a computer readable memory, wherein the filter banks have a narrower frequency range and have closer mid-frequency spacing in frequencies between about 750 hz and 1450 hz than above 1500 hz or below 500 hz;
   flagging loudness peaks among the filter banks that are above cross-frequency and time masking thresholds in the sample frames, wherein the cross-frequency masking threshold for a particular frame is set relative to filter band characterizations of one or more masking sounds and the time masking threshold for successive frames is set relative to the filter band characterizations of the masking sounds; and
   coding the flagged loudness peaks in relation to the cross-frequency and time masking thresholds to create a frame-by-frame, filter bank-by-filter bank characteristic matrix.

2. The method of claim 1, whereby the flagging of loudness peaks above the cross-frequency and time masking thresholds avoids including in the frame-by-frame, filter bank-by-filter bank characteristic matrix of particular sound components that are likely to be eliminated from a frame sample by an auditory perception codec.

3. The method of claim 1, further including flagging one or more filter banks adjoining a particular filter bank at which a loudness peak was flagged.

4. The method of claim 1, further including flagging three or more peaks, centered at about the particular filter bank.

5. The method of claim 1, further including flagging five or more peaks, centered at about the particular filter bank.

6. The method of claim 1, wherein the flagging loudness peaks and flagging adjoining filter banks effectively broadens frequency widths of the loudness peaks.

7. The method of claim 1, wherein the coding includes:
   first coding the flagged loudness peaks within the particular frame against the cross-frequency masking threshold by first bands of relative loudness;
   second coding the flagged loudness peaks within the particular frame against the time masking threshold by second bands of relative loudness;
   combining the first coding and second coding to set filter bank-by-filter bank values in the characteristic matrix for the particular frame; and
   repeating the first and second coding and the combining for numerous sample frames of the sound.

8. The method of claim 7, wherein the values in the characteristic matrix are Boolean.

9. The method of claim 1, further including:
   creating reference characteristic matrices for numerous reference sounds and at least one query characteristic matrix for a query sound;
   comparing alignments of the query characteristic matrix to at least some of the reference characteristic matrices, including identifying filter bank-by-filter bank positive peak matches, negative peak matches, peak in query but not in reference mismatches, and peak in reference but not in query mismatches;
   frame-by-frame, deriving composite scores across filter banks that distinctly weight and combine the positive peak matches, the negative peak matches, the peak in query but not in reference mismatches and peak in reference but not in query mismatches;
   combining the frame-by-frame composite scores into query scores for the alignments and selecting one or more best alignments of the query characteristic matrix to the reference characteristic matrices; and
   organizing the composite scores for the best alignments to identify likely query-to-reference characteristic matrix matches.

10. Repeating the method of claim 9 for multiple versions of the query characteristic matrix, prepared from the query sound using versions of sample frames that have starting times within the query sound that are offset in time between the sample frame versions.

11. The method of claim 9, further including comparing the composite scores for the best alignments and identifying as a true match one of the composite scores that is significantly better than any others of the composite scores, only if it is significantly better.

12. The method of claim 9, further including comparing the composite scores for the best alignments and identifying as identical true matches a plurality of the composite scores that match each other and that are significantly better than any others of the composite scores, only if it is significantly better.

13. A method for accurately searching music references to find a music reference which matches a query including:
   using a processing device, creating frame-by-frame, filter bank-by-filter bank reference characteristic matrices for numerous reference sounds and at least one frame-by-frame, filter bank-by-filter bank query characteristic matrix for a query sound;
   comparing alignments of the query characteristic matrix to at least some of the reference characteristic matrices, including identifying filter bank-by-filter bank positive peak matches, negative peak matches, peak in query but not in reference mismatches, and peak in reference but not in query mismatches;
   frame-by-frame, deriving a plurality of composite scores across filter banks that distinctly weight and combine the positive peak matches, the negative peak matches, the peak in query but not in reference characteristic mismatches and peak in reference but not in query mismatches;
   combining the frame-by-frame composite scores into query scores for the alignments and selecting one or more best alignments of the query characteristic matrix to the reference characteristic matrices; and organizing the composite scores for the best alignments to identify likely query-to-reference characteristic matrix matches.

14. Repeating the method of claim 13 for multiple versions of the query characteristic matrix, prepared from the query sound using versions of sample frames that have starting times within the query sound that are offset in time between the sample frame versions.

15. The method of claim 13, further including comparing the composite scores for the best alignments and identifying as a true match one of the composite scores that is significantly better than any others of the composite scores, only if it is significantly better.

16. The method of claim 13, further including comparing the composite scores for the best alignments and identifying as identical true matches a plurality of the composite scores that match each other and that are significantly better than any others of the composite scores, only if it is significantly better.

17. The method of claim 13, wherein the scoring further includes:
   first coding the flagged loudness peaks within a particular frame against a cross-frequency masking threshold by first bands of relative loudness;
   second coding the flagged loudness peaks within the particular frame against a time masking threshold by second bands of relative loudness;
   combining the first coding and second coding to set filter bank-by-filter bank characteristic matrix flags for the particular frame; and
   repeating the first and second coding and the combining for numerous sample frames of the sound.

18. A device that creates a resilient fingerprint of a reference sound or a query sound, including:
   at least one processor configured to carry out actions including:
   using a processing device, repeatedly characterizing loudness of sound components grouped in filter banks of sample frames and residing in a computer readable memory, wherein the filter banks have a narrower frequency range and have closer mid-frequency spacing in frequencies between about 750 hz and 1450 hz than above 1500 hz or below 500 hz;
   flagging loudness peaks among the filter banks that are above cross-frequency and time masking thresholds in the sample frames, wherein the cross-frequency masking threshold for a particular frame is set relative to filter band characterizations of one or more masking sounds and the time masking threshold for successive frames is set relative to the filter band characterizations of the masking sounds; and
   coding the flagged loudness peaks in relation to the cross-frequency and time masking thresholds to create a frame-by-frame, filter bank-by-filter bank characteristic matrix.

19. The device of claim 18, wherein the flagging of loudness peaks above the cross-frequency and time masking thresholds avoids including in the frame-by-frame, filter bank-by-filter bank characteristic matrix of particular sound components that are likely to be eliminated from a frame sample by an auditory perception codec.

20. The device of claim 18, wherein the processor is further configured to carry out actions including flagging one or more filter banks adjoining a particular filter bank at which a loudness peak was flagged.

21. The device of claim 18, wherein the coding includes:
   first coding the flagged loudness peaks within the particular frame against the cross-frequency masking threshold by first bands of relative loudness;
   second coding the flagged loudness peaks within the particular frame against the time masking threshold by second bands of relative loudness;
   combining the first coding and second coding to set filter bank-by-filter bank values in the characteristic matrix for the particular frame; and
   repeating the first and second coding and the combining for numerous sample frames of the sound.

22. The device of claim 18, therein the processor is further configured to carry out actions including:
   creating reference characteristic matrices for numerous reference sounds and at least one query characteristic matrix for a query sound;
   comparing alignments of the query characteristic matrix to at least some of the reference characteristic matrices, including identifying filter bank-by-filter bank positive peak matches, negative peak matches, peak in query but not in reference mismatches, and peak in reference but not in query mismatches;
   frame-by-frame, deriving composite scores across filter banks that distinctly weight and combine the positive peak matches, the negative peak matches, the peak in query but not in reference mismatches and peak in reference but not in query mismatches;
   combining the frame-by-frame composite scores into query scores for the alignments and selecting one or more best alignments of the query characteristic matrix to the reference characteristic matrices; and
   organizing the composite scores for the best alignments to identify likely query-to-reference characteristic matrix matches.

23. The device of claim 22, wherein the processor is further configured to carry out actions including repeatedly analyzing multiple versions of the query characteristic matrix, prepared from the query sound using versions of sample frames that have starting times within the query sound that are offset in time between the sample frame versions.

24. The device of claim 22, wherein the processor is further configured to carry out the action of comparing the composite scores for the best alignments and identifying as identical true matches a plurality of the composite scores that match each other and that are significantly better than any others of the composite scores, only if it is significantly better.
   first coding the flagged loudness peaks within a particular frame against a cross-frequency masking threshold by first bands of relative loudness;
   second coding the flagged loudness peaks within the particular frame against a time masking threshold by second bands of relative loudness;
   combining the first coding and second coding to set filter bank-by-filter bank characteristic matrix flags for the particular frame; and
   repeating the first and second coding and the combining for numerous sample frames of the sound.

25. A device that searches music references to find a music reference which matches a query, including:
   at least one processor configured to carry out actions including:
   creating frame-by-frame, filter bank-by-filter bank reference characteristic matrices for numerous reference sounds and at least one frame-by-frame, filter bank-by-filter bank query characteristic matrix for a query sound;
   comparing alignments of the query characteristic matrix to at least some of the reference characteristic matrices, including identifying filter bank-by-filter bank positive peak matches, negative peak matches, peak in query but not in reference mismatches, and peak in reference but not in query mismatches;

frame-by-frame, deriving a plurality of composite scores across filter banks that distinctly weight and combine the positive peak matches, the negative peak matches, the peak in query but not in reference characteristic mismatches and peak in reference but not in query mismatches;

combining the frame-by-frame composite scores into query scores for the alignments and selecting one or more best alignments of the query characteristic matrix to the reference characteristic matrices; and organizing the composite scores for the best alignments to identify likely query-to-reference characteristic matrix matches.

26. The device of claim 25, wherein the processor is further configured to carry out actions including comparing the composite scores for the best alignments and identifying as a true match one of the composite scores that is significantly better than any others of the composite scores, only if it is significantly better.

27. The device of claim 25, wherein the processor is further configured to carry out actions including comparing the composite scores for the best alignments and identifying as identical true matches a plurality of the composite scores that match each other and that are significantly better than any others of the composite scores, only if it is significantly better.

28. The device of claim 25, wherein the scoring further includes:

29. A non-transitory computer storage medium encoded with a computer program, the program comprising instructions that when executed by at least one processor cause the processor to perform operations including:

using a processing device, repeatedly characterizing loudness of sound components grouped in filter banks of sample frames and residing in a computer readable memory, wherein the filter banks have a narrower frequency range and have closer mid-frequency spacing in frequencies between about 750 hz and 1450 hz than above 1500 hz or below 500 hz;

flagging loudness peaks among the filter banks that are above cross-frequency and time masking thresholds in the sample frames, wherein the cross-frequency masking threshold for a particular frame is set relative to filter band characterizations of one or more masking sounds and the time masking threshold for successive frames is set relative to the filter band characterizations of the masking sounds; and coding the flagged loudness peaks in relation to the cross-frequency and time masking thresholds to create a frame-by-frame, filter bank-by-filter bank characteristic matrix.

30. The computer storage medium of claim 29, wherein the flagging of loudness peaks above the cross-frequency and time masking thresholds avoids including in the frame-by-frame, filter bank-by-filter bank characteristic matrix of particular sound components that are likely to be eliminated from a frame sample by an auditory perception codec.

31. The computer storage medium of claim 29, wherein the instructions further cause the processor to perform operations including flagging one or more filter banks adjoining a particular filter bank at which a loudness peak was flagged.

32. The computer storage medium of claim 29, wherein the coding includes:

first coding the flagged loudness peaks within the particular frame against the cross-frequency masking threshold by first bands of relative loudness;

second coding the flagged loudness peaks within the particular frame against the time masking threshold by second bands of relative loudness;

combining the first coding and second coding to set filter bank-by-filter bank values in the characteristic matrix for the particular frame; and repeating the first and second coding and the combining for numerous sample frames of the sound.

33. The computer storage medium of claim 29, wherein the instructions further cause the processor to perform operations including:

creating reference characteristic matrices for numerous reference sounds and at least one query characteristic matrix for a query sound;

comparing alignments of the query characteristic matrix to at least some of the reference characteristic matrices, including identifying filter bank-by-filter bank positive peak matches, negative peak matches, peak in query but not in reference mismatches, and peak in reference but not in query mismatches;

frame-by-frame, deriving composite scores across filter banks that distinctly weight and combine the positive peak matches, the negative peak matches, the peak in query but not in reference mismatches and peak in reference but not in query mismatches;

combining the frame-by-frame composite scores into query scores for the alignments and selecting one or more best alignments of the query characteristic matrix to the reference characteristic matrices; and organizing the composite scores for the best alignments to identify likely query-to-reference characteristic matrix matches.

34. The computer storage medium of claim 33, wherein the instructions further cause the processor to perform operations including analyzing multiple versions of the query characteristic matrix, prepared from the query sound using versions of sample frames that have starting times within the query sound that are offset in time between the sample frame versions.

35. The computer storage medium of claim 33, wherein the instructions further cause the processor to perform operations including comparing the composite scores for the best alignments and identifying as identical true matches a plurality of the composite scores that match each other and that are significantly better than any others of the composite scores, only if it is significantly better.

36. A computer readable storage medium that searches music references to find a music reference which matches a query, including:

at least one processor configured to carry out actions including:

creating frame-by-frame, filter bank-by-filter bank reference characteristic matrices for numerous reference sounds and at least one frame-by-frame, filter bank-by-filter bank query characteristic matrix for a query sound;

comparing alignments of the query characteristic matrix to at least some of the reference characteristic matrices, including identifying filter bank-by-filter bank positive peak matches, negative peak matches, peak in query but not in reference mismatches, and peak in reference but not in query mismatches;

frame-by-frame, deriving a plurality of composite scores across filter banks that distinctly weight and combine the positive peak matches, the negative peak matches, the peak in query but not in reference characteristic mismatches and peak in reference but not in query mismatches;

combining the frame-by-frame composite scores into query scores for the alignments and selecting one or more best alignments of the query characteristic matrix to the reference characteristic matrices; and organizing the composite scores for the best alignments to identify likely query-to-reference characteristic matrix matches.

37. The computer storage medium of claim 36, wherein the instructions further cause the processor to perform operations including comparing the composite scores for the best alignments and identifying as a true match one of the composite scores that is significantly better than any others of the composite scores, only if it is significantly better.

38. The computer storage medium of claim 36, wherein the instructions further cause the processor to perform operations including comparing the composite scores for the best alignments and identifying as identical true matches a plurality of the composite scores that match each other and that are significantly better than any others of the composite scores, only if it is significantly better.

39. The computer storage medium of claim 36, wherein the scoring further includes:

first coding the flagged loudness peaks within a particular frame against a cross-frequency masking threshold by first bands of relative loudness;

second coding the flagged loudness peaks within the particular frame against a time masking threshold by second bands of relative loudness;

combining the first coding and second coding to set filter bank-by-filter bank characteristic matrix flags for the particular frame; and repeating the first and second coding and the combining for numerous sample frames of the sound.

* * * * *